United States Patent
Jagannathan et al.

(10) Patent No.: US 8,472,350 B2
(45) Date of Patent: Jun. 25, 2013

(54) BANK AWARE MULTI-BIT TRIE

(75) Inventors: Rajesh Jagannathan, Oakland, CA (US); Brian Alleyne, Los Gatos, CA (US); Ramanathan Lakshmikanthan, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 196 days.

(21) Appl. No.: 12/983,098

(22) Filed: Dec. 31, 2010

(65) Prior Publication Data

US 2012/0170580 A1    Jul. 5, 2012

(51) Int. Cl.
*H04L 12/28* (2006.01)
(52) U.S. Cl.
USPC ............ 370/256; 370/254; 370/392; 370/408
(58) Field of Classification Search
None
See application file for complete search history.

(56) References Cited

U.S. PATENT DOCUMENTS

| | | | |
|---|---|---|---|
| 6,370,144 B1 * | 4/2002 | Chao et al. | 370/395.42 |
| 7,535,907 B2 * | 5/2009 | Hussain et al. | 370/392 |
| 7,733,888 B2 * | 6/2010 | Mathews et al. | 370/412 |
| 8,144,705 B1 * | 3/2012 | Aybay | 370/389 |
| 8,364,803 B2 * | 1/2013 | Sundstrom | 709/223 |
| 2004/0186945 A1 * | 9/2004 | Jeter et al. | 711/5 |
| 2005/0018682 A1 * | 1/2005 | Ferguson et al. | 370/392 |
| 2008/0181139 A1 * | 7/2008 | Rangarajan et al. | 370/256 |

OTHER PUBLICATIONS

Will Eatherton et al., "Tree Bitmap: Hardware/Software IP Lookups with Incremental Updates," Apr. 2004, pp. 97-122, vol. 34, No. 2, ACM SIGCOMM Computer Communications Review.

* cited by examiner

*Primary Examiner* — Phirin Sam
(74) *Attorney, Agent, or Firm* — Blakely, Sokoloff, Taylor & Zafman LLP

(57) ABSTRACT

Embodiments of the invention include a method performed by a bank aware mtrie control module for distributing a plurality of mtrie levels across a plurality of memory banks. The bank aware mtrie control module identifies the plurality of memory banks present and identifies one or more mtrie blocks in one or more mtrie levels, each mtrie block is an array of mtrie nodes associated with an mtrie level. The bank aware mtrie control module stores each mtrie block in one of the plurality of memory banks, all mtrie nodes in a given mtrie block are stored in the same memory bank. For each subsequent mtrie level, the bank aware mtrie control module ensures that each of the mtrie blocks in that mtrie level is stored in one of the plurality of memory banks other than the memory bank storing mtrie blocks of an immediately previous mtrie level.

9 Claims, 6 Drawing Sheets

BANK AWARE MULTI-BIT TRIE

FIELD OF THE INVENTION

Embodiments of the invention relate generally to the field of multi-bit trie and more particularly to a memory bank aware multi-bit trie.

BACKGROUND

A multi-bit trie (mtrie) is a tree data structure that is predominantly used for longest prefix match of a given key (e.g. IP address) to obtain the associated value (e.g. route or next-hop). At its simplest each node in the mtrie is of two types (1) leaf or (2) mtrie node. A leaf node, as the name suggests stores the value and terminates the search. Often, mtrie nodes store a stride size S indicating the number of bits from the remaining portion of the key to process in order to determine which branch to take. The number of possible branches is $2^S$ and the key bits (S of them) provide the index of the child node.

Instead of storing all $2^S$ pointers (to the children brances), the mtrie nodes are often optimized for space. This is done by storing the children of a given mtrie node in a contiguous array (mtrie block). And mtries node store a base pointer to the start of that node's children branch mtrie block. Given the base address (BA) of mtrie block, the size of each mtrie node (SZ) in the mtrie block and the index of the child node (I) one can easily compute the memory address (AD) of the child node using the formula: $AD(I)=BA+SZ*I$.

FIG. 1 is a block diagram illustrating a 3 level mtrie according to the prior art. Level 0 100 is the root node and has a stride of 3 bits and base pointer Ptr1 pointing to its child mtrie block level 1 110. Notice that the children of the root at level 1A are stored in a contiguous mtrie block as an array of $2^3$ entries (0 to 7). The entry at index 001 is shown as having a stride of 3 and a base pointer of Ptr2 pointing to the base address of level 2A 120. The entry at index 011 of level 1A 110 is shown as having a stride of 2 and a base pointer of Ptr3 pointing to the base address of level 2B 121. The entry at index 110 of level 1A is shown as having a stride of 1 and a base pointer of Ptr4 pointing to the base address of level 2C 122.

A lookup in the mtrie starts off at the root along with the key supplied. At each intermediate mtrie node a portion of the key (as specified by the stride) is used up to determine the next node, and so on. Finally once a leaf node is reached the lookup terminates with the value stored in the leaf. FIG. 1 illustrates a look up of a key in the mtrie using four steps, circled as 1-4. Step 1 shows that a lookup of the key 001100 is being performed. The stride in level 0 100 is three, so the look up uses the three most significant bits to index the child branch level 1 at index 001. Step 2 indexes level 1A 110 accessing an mnode at index 001 pointing to level 2A 120 and showing a stride of three. Step 3 uses the stride of three and Ptr2 to index level 2A at index 100. Step 4 accesses a leaf node at index 100 which holds the value associated with key 001100.

Memory technology is such that each memory device is organized into a set of banks (e.g. 4 or 8). A subset of bits from the address is chosen as the bank selector when the device is initially configured. In general the bank selector bits are chosen such that first chunk (e.g. first 8, first 16, or first 32 bytes) is assigned to the first bank and the next chunk assigned to the next bank and so on. The term striping is also used to describe the size of the chunks and how the addresses are distributed across the different banks. Apart from the memory technology the number of banks and striping size (chunk size) is also a function of memory controller that manages the memory.

FIG. 2 is a block diagram illustrating a 4 level mtrie stored in 4 banks of memory according to the prior art. FIG. 2 shows four banks of memory, banks 0-3, in four columns. The memory addresses start at 0x000 at the first memory chunk in bank and increment from left to right such that the first memory chunk of bank 1 is at address 0x010, the first memory chunk of bank 2 is at address 0x020, and the first memory chunk of bank 3 is at address 0x030. The second memory chunk of bank 0 is at address 0x040. This addressing scheme continues to the last, seventh, memory chunk of bank 0 being at address 0x180, the last chunk of bank 1 being at address 0x190, the last chunk of bank 2 being at address 0x1A0, and the last chunk of bank 3 being at address 0x1B0. Thus, an array allocated through contiguous addresses spanning more than 16 bytes (the width of one memory chunk in FIG. 2) would span at least two memory banks.

In FIG. 2, a four level mtrie begins with a root node level 0 200 stored in the first chunk of bank 0 at address 0x000. The root node points to level 1 210 which starts at second memory chunk of bank 1, address 0x050, and spans to the second memory chunk of bank 3, address 0x07F. A mtrie node in level 1 210 points to level 2A 220, stored at the fifth chunk of bank 0 and spanning to the fifth chunk of bank 1, stored at addresses 0x100 through 0x11F. Another mtrie node in level 1 210 point to level 2B 221, stored at the fifth chunk of bank 2 and spanning to the fifth chunk of bank 3, stored at addresses 0x120 through 0x13F. A mtrie node in level 2A 220 points to level 3A 230 in the seventh chunk of bank 0 at address 0x180. A mtrie node in level 2B 221 points to level 3B 231 in the seventh chunk of bank 2 and spanning to the seventh chunk of bank 3 at addresses 0x1A0-0x1BF.

Another aspect that defines a memory device (and the controller) is the maximum transaction rate. The maximum transaction rate is the number of access (reads and writes) which can be performed per second. A memory device has a aggregate maximum transaction rate and a per bank maximum transaction rate. The following table provides an exemplary comparison of two on-chip memory technologies, static random access memory (SRAM) and embedded dynamic random access memory (eDRAM), and two off-chip memory technologies, reduced latency dynamic random access memory (RL-DRAM) and double data rate synchronous dynamic random access memory (DDR-SDRAM).

| Memory Type | Number of Banks | Striping Size | Total Size | Throughput Per Bank (transactions per second) | Throughput Aggregate (transactions per second) |
|---|---|---|---|---|---|
| SRAM | 1 | 16 byes | 128 KB | 750 | 750 |
| eDRAM | 8 | 16 bytes | 1 MB | 150 | 600 |
| RL-DRAM | 8 | 16 bytes | 64 MB | 60 | 480 |
| DDR-SDRAM | 8 | 32 bytes | 1 GB | 20 | 160 |

Even though a memory device (with b banks) is rated for an aggregate throughput of M transactions per second, the effective throughput achieved depends on how the accesses are evenly distributed across the b banks. For example, the eDRAM device is shown to have an aggregate throughput of 600 tps for the device as a whole and a per bank throughput 150 tps. This means that for one to realize the maximum throughput provided the accesses to this eDRAM needs to be spread over at least 4 of the 8 banks.

In the worst case, if all the accesses targeted a single bank, then the effective throughput will be that of a single bank (M/b). The term bank collision is used to indicate the fact that the access to a memory device, are unequally distributed across the banks. Since bank collisions pull down the performance of the memory device it is undesirable.

Existing schemes for avoiding bank collisions rely on randomness and statistical distribution to provide an even distribution access across the banks. The randomization can be performed at memory allocation time so that there is no regularity in which addresses are assigned to which nodes. If multiple data structures are mapped to the same memory device one can see how the randomization in allocation for multiple data structures reduces the probability of uneven distribution across banks. Hashing is also used to further scramble how the banks are picked given the memory addresses themselves.

In the context of a network processing unit (NPU) used in a packet forwarding application, and specifically an mtrie used for internet protocol (IP) address lookups, the lookups are generally keyed off some packet attributes (e.g., source IP address). Each of the lookups in turn translates into a sequence of memory accesses depending on the key used for the lookup. Hence, once the data structure has been setup the access pattern depends on the traffic mix. This is where additional assumption on randomness and statistical distribution of access come into play.

However the above techniques do not completely eliminate the possibility of bank collisions. Therefore, while the reliance on randomness and statistical distribution is good enough for most real world applications, it may not be appropriate for all scenarios (when one or more of these assumptions are invalid).

In the context of an NPU some data structures are placed on chip for raw performance reasons. On-chip memory tends to be small in size. So given the size limitation, such memories can only accommodate one or two data structures or in some cases only a portion of a larger data structure. Hence on-chip memory tends not to get the benefit of randomization in memory allocation to avoid bank collisions. Also, solutions that depend on randomness are not suitable in some hardware implementations where there is a need to strictly budget for and guarantee performance.

SUMMARY OF THE INVENTION

Embodiments of the invention include a network element coupled to a network and configured to receive packets from other network elements of the network. The network element processes the packets and maintains an internet protocol (IP) address lookup table within a bank aware multi-bit trie (mtrie). The network element comprises a plurality of network interfaces configured to receive packets from other network elements of the network, each packet comprising a destination IP address. The network element further comprises a processor coupled to the plurality of network interfaces and configured to process the received packet and determine a next hop for one or more of the received packets. The network element further comprises a memory and a memory control module. The memory coupled to the processor and configured to store the bank aware mtrie. The memory control module is coupled to the processor and to the memory and comprises a plurality of memory banks. The memory control module is configured to identify the plurality of memory banks present in the memory. The memory control modules is further configured to identify one or more mtrie blocks in one or more mtrie levels in the bank aware mtrie. The memory control modules is further configured to store all mtrie nodes for a given mtrie block in the same memory bank. The memory control modules is further configured to store a stride length and a pointer to another mtrie block in one or more mtrie nodes and configured to store a forwarding interface identifier in one or more mtrie nodes. For each subsequent mtrie level, the memory control module is further configured to ensure that each of the mtrie blocks in that mtrie level is stored in one of plurality of memory banks other than the memory bank that stores mtrie blocks of an immediately previous mtrie level.

Embodiments of the invention include a method performed by a bank aware multi-bit (mtrie) control module for distributing a plurality of mtrie levels in a mtrie across a plurality of memory banks in a memory. The bank aware mtrie control module identifies the plurality of memory banks present in the memory. The bank aware mtrie control module identifies one or more mtrie blocks in one or more mtrie levels, each mtrie block is an array of mtrie nodes associated with an mtrie level. The bank aware mtrie control module stores each of the one or more mtrie blocks in one of the plurality of memory banks, all mtrie nodes in a given mtrie block are stored in the same memory bank. For each subsequent mtrie level, the bank aware mtrie control module ensures that each of the mtrie blocks in that mtrie level is stored in one of the plurality of memory banks other than the memory bank storing mtrie blocks of an immediately previous mtrie level.

Embodiments of the invention include a memory control module to be coupled to a processor and a memory which comprises a plurality of memory banks. The memory control module distributes a plurality of multi-bit (mtrie) levels accress the plurality of memory banks. The memory control module comprises a bank aware mtrie control module configured to identify the plurality of memory banks present in the memory. The bank aware mtrie control module further configured to indentify one or more mtrie blocks in one or more mtrie levels, each mtrie block is an array of mtrie nodes associated with an mtrie level. The bank aware mtrie control module further configured to store each of the one or more mtrie blocks in one of the plurality of memory banks, all mtrie nodes in a given mtrie block are stored in the same memory bank. For each subsequent mtrie level, the bank aware mtrie control module further configured to ensure that each of the mtrie blocks in that mtrie level is stored in one of the plurality of memory banks other than the memory bank storing mtrie blocks of an immediately previous mtrie level.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DETAILED DESCRIPTION

The following description describes methods and apparatus for storing a bank aware multi-bit trie within a network element. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 3:
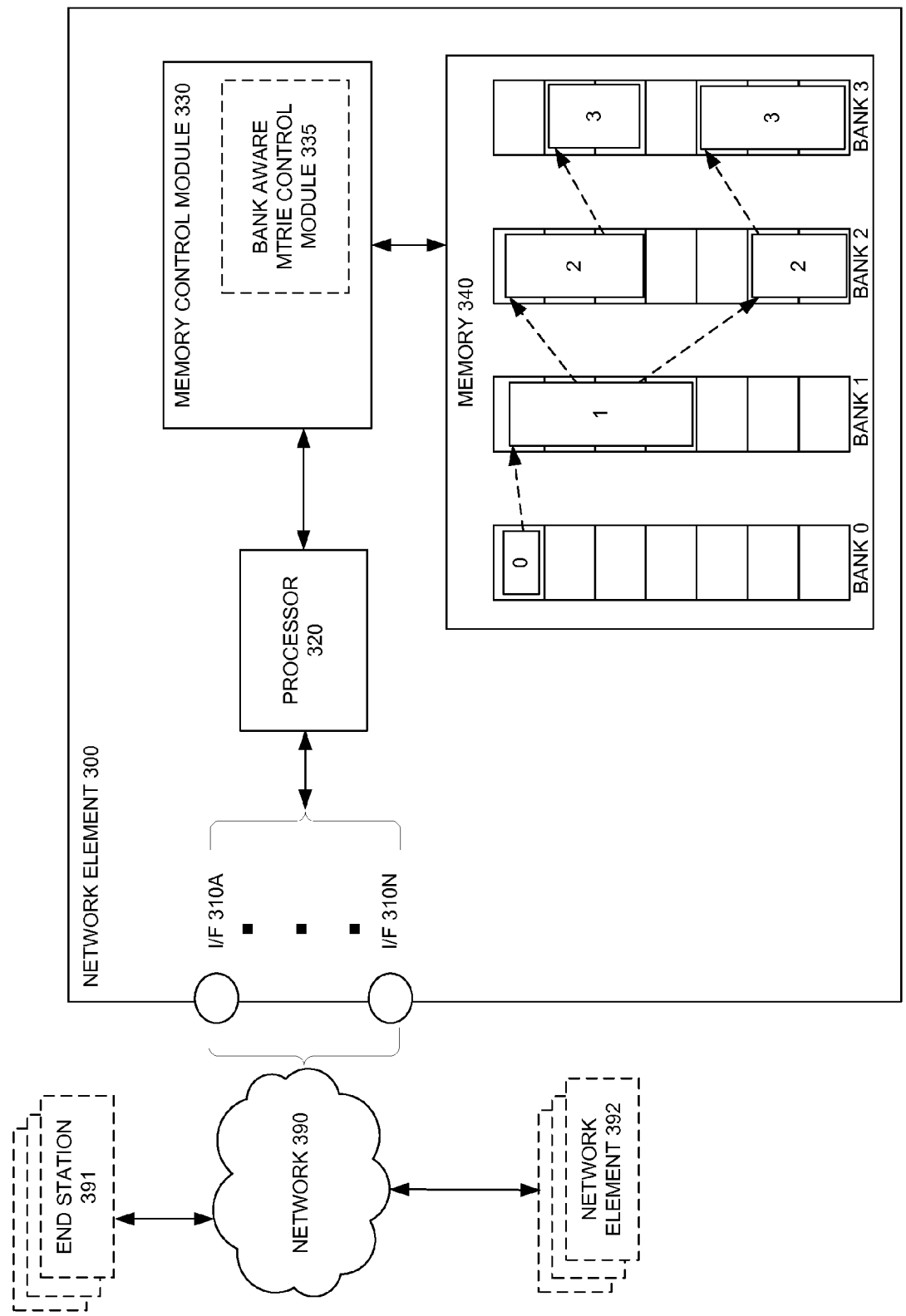
FIG. 3 is a block diagram illustrating a network element with a bank aware multi-bit trie (mtrie) according to embodiments of the invention.

FIG. 3 is a block diagram illustrating a network element with a bank aware multi-bit trie (mtrie) according to embodiments of the invention. Instead of relying on randomness, the network element distributes the mtrie levels across memory banks ensuring that all mtrie nodes in a given mtrie block are placed in the same memory bank and that mtrie blocks of different mtrie levels are placed in different banks. The advantage of this is that irrespective of the key being looked up, and consequently the path followed through the mtrie to find the corresponding mtrie leaf node, any lookup which accesses the different level will hit different memory banks. Therefore memory accesses to the memory devices will be more evenly distributed across banks and thus reducing bank collisions.

The network element 300 is coupled to a network 390. In one embodiment, the network element 300 is coupled to a plurality of end stations (such as subscriber end stations or server end stations) 391 through the network 390. In another embodiment, the network element 300 is coupled to a plurality of other network elements 392 through the network 390. In yet another embodiment, the network element is coupled to a plurality of end stations 391 and a plurality of network elements 392 though the network 390. The first network element 300 is comprised of a plurality of network interfaces 310A-310N which are coupled to a processor 320. The processor 320 is further coupled to a memory control module 330 which is coupled to a memory 340. The memory stores a bank aware mtrie (e.g. an internet protocol (IP) address lookup table within a mtrie). In one embodiment the memory is RL-DRAM (reduced-latency dynamic random access memory). Another embodiment may use other types of memory (e.g., eDRAM (embedded dynamic random access memory)). While other embodiments utilize DDR-DRAM (double date rate dynamic random access memory) or SDR-DRAM (single date rate dynamic random access memory). In some embodiments, the memory control module 330 further comprises a bank aware mtrie control module 335 (shown in dotted lines) specifically to setup and maintain a bank aware mtrie within the memory 340. In other embodiments, the bank aware mtrie control modules 335 is comprised of a set of instructions executed by the processor 320 and memory control module 330 to setup and maintain the bank aware mtrie within the memory 340.

In one embodiment, the network element 300 utilizes the bank aware mtrie to store and maintain an IP address lookup table that associates destination IP addresses with a next hops. As the processor receives packets through the plurality of network interfaces, the processor determines the next hop for one or more of the received packets. As the processor learns new associations between IP addresses and next hops, the processor directs the memory control module 330 to store new entries in the IP address lookup table using the IP address as a key and the next hop as the associated value.

Figure 4:
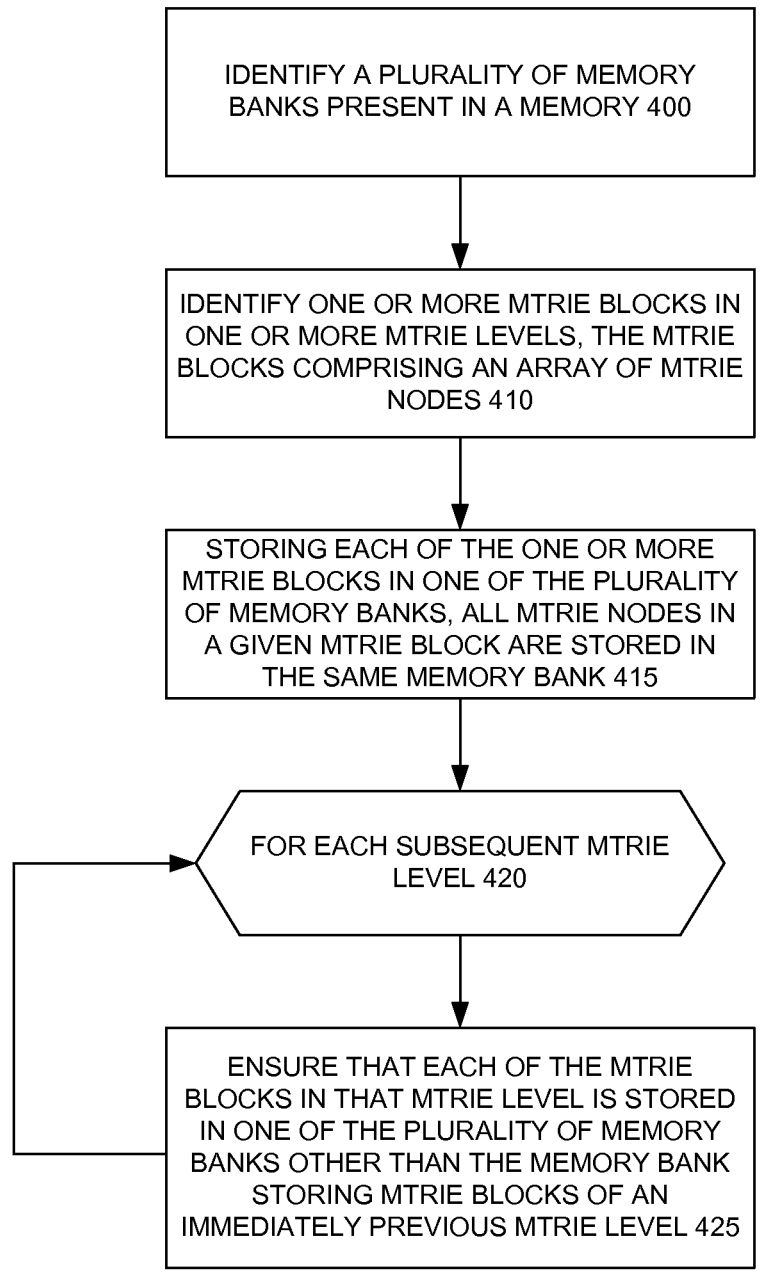
FIG. 4 is a flow chart illustrating a method of maintaining a bank aware mtrie according to embodiments of the invention.

FIG. 4 is a flow chart illustrating a method of maintaining a bank aware mtrie according to embodiments of the invention. In block 400, the memory control module 330 indentifies a plurality of memory banks present in the memory 340. In block 410, the memory control module 330 identifies one or more mtrie blocks that will each be placed in one of a plurality of mtrie levels. Each mtrie block is an array of mtrie nodes associated with a given mtrie level. In block 415, the memory control module 330 will store each mtrie block in one of the plurality of memory banks so that all mtrie nodes for a given mtrie level are stored in the same memory bank. In one embodiment, mtrie nodes that point to another level, the memory control module 330 stores a stride size (stride length), which identifies how much of the key to use as the next index, and a pointer to another mtrie block of the next level. In other embodiments, mtrie nodes that point to another level do not store the stride length as it is fixed across all mtrie nodes in the mtrie. In mtrie nodes that are leaf nodes, the memory control module 330 will store a corresponding value, such as the next hop (forwarding interface identifier) that corresponds to a particular IP address used as a key for that leaf node. When storing multiple mtrie blocks of multiple mtrie levels, the memory control module perform the following for each subsequent level 420: the memory control module 330 will ensure that each mtrie block in each mtrie level is stored in one or the memory banks other than the memory bank that stores the mtrie block of the immediately previous mtrie level in block 425. In one embodiment, the memory control module 330 will further ensure that all mtrie blocks in a given mtrie level are stored in the same memory banks. Further still in another embodiment, the memory control module 330 will ensure that each memory bank contains only mtrie blocks from one mtrie level.

Referring back to FIG. 3, a four level bank aware mtrie is illustrated within the memory 340 distributed across the four memory levels. Those skilled in the art would recognize that the depth of the memory and the depth of the mtrie are not explicitly tied together and are shown here merely for illustrative purposes. In bank 0, a root mtrie node level 0 is stored and points to a mtrie child branch level 1 mtrie block stored in bank 1. Mtrie nodes in the level 1 mtrie block point to two separate level 2 mtrie blocks stored in bank 2. Mtrie nodes in the level 2 mtrie blocks point to two separate level 3 mtrie blocks stored in bank 3. FIG. 3 can be explained with more detail with reference to FIG. 5.

Figure 1:
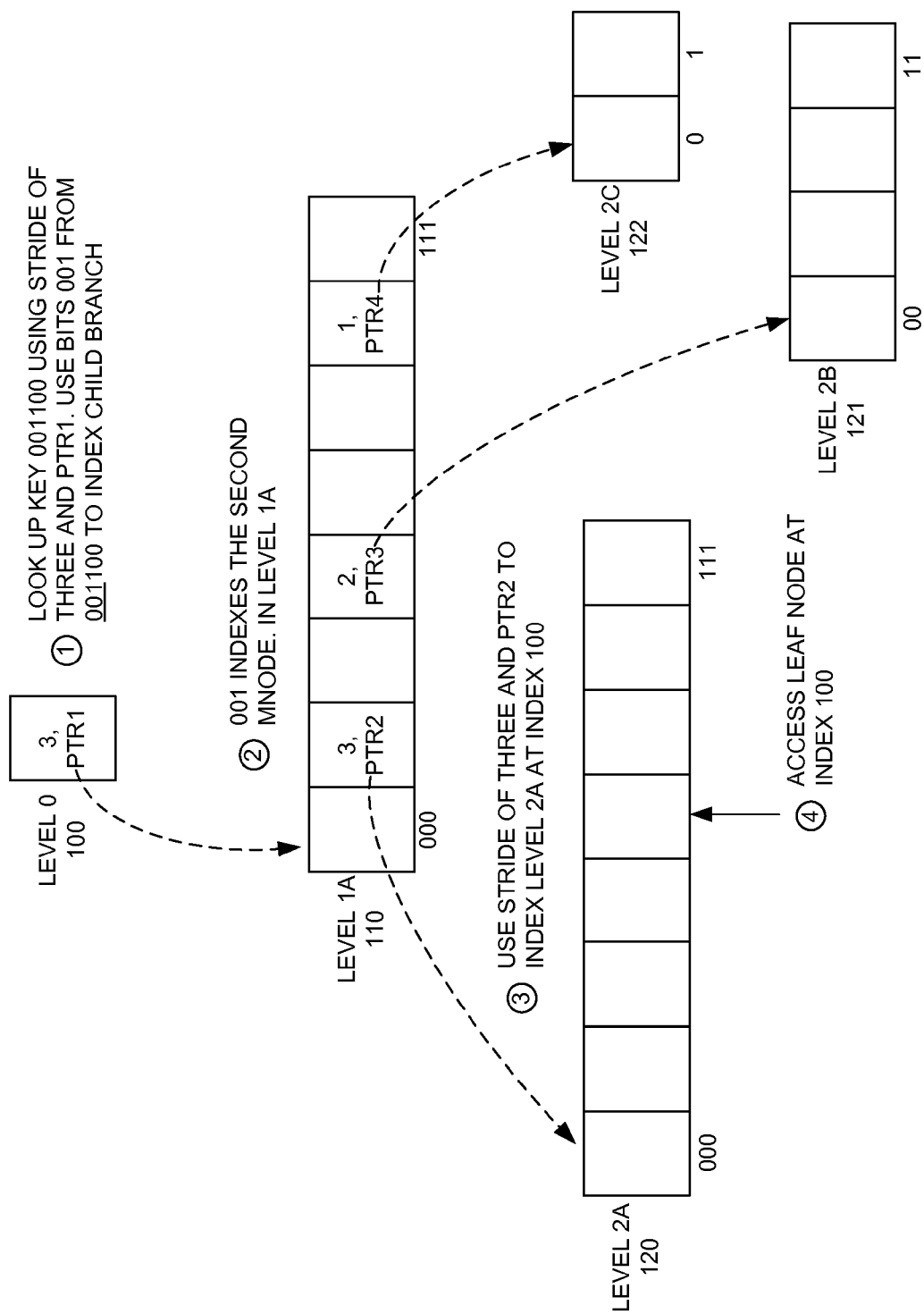
FIG. 1 is a block diagram illustrating a 3 level mtrie according to the prior art.
Figure 2:
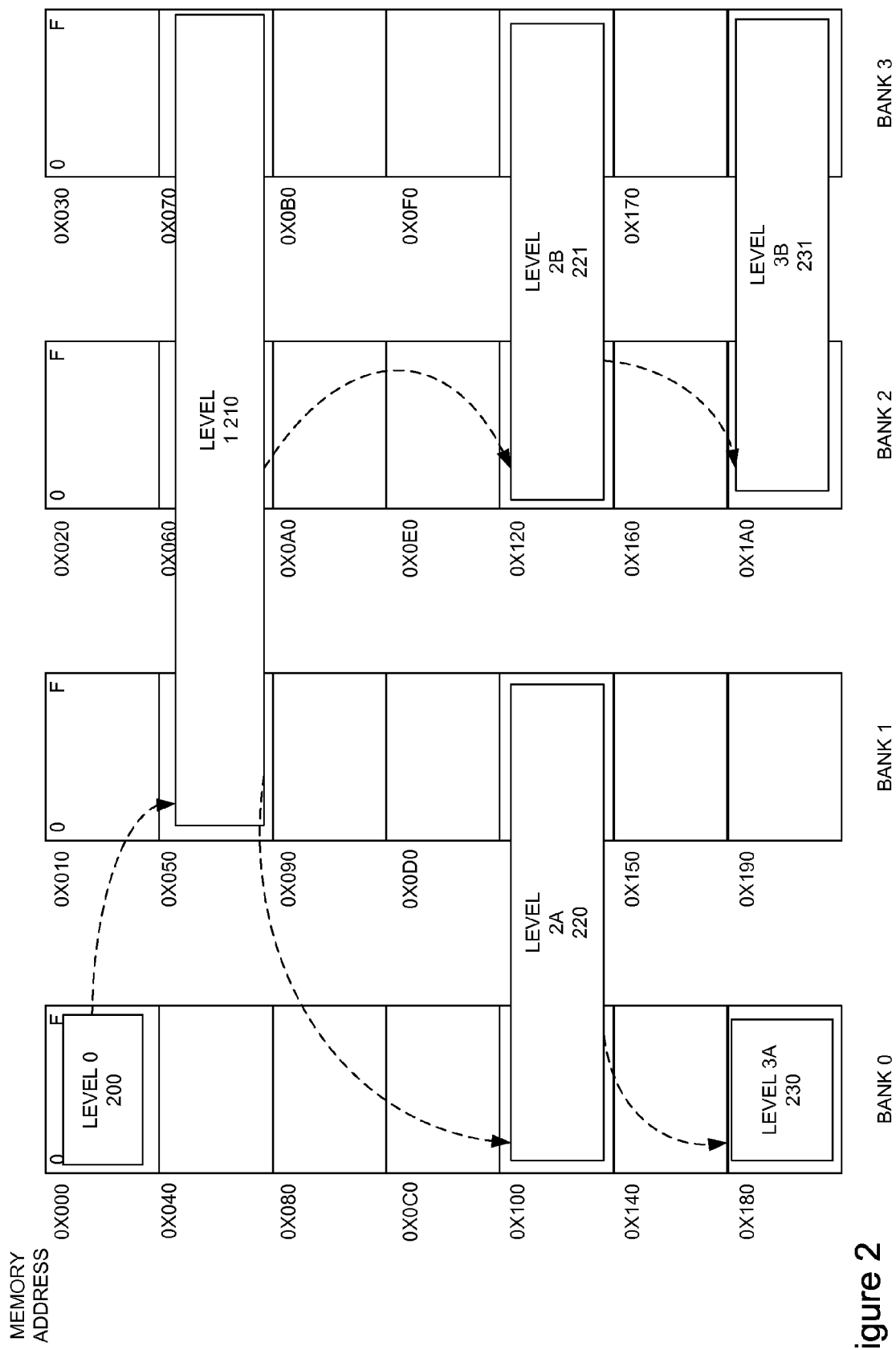
FIG. 2 is a block diagram illustrating a 4 level mtrie stored in 4 banks of memory according to the prior art.
Figure 5:
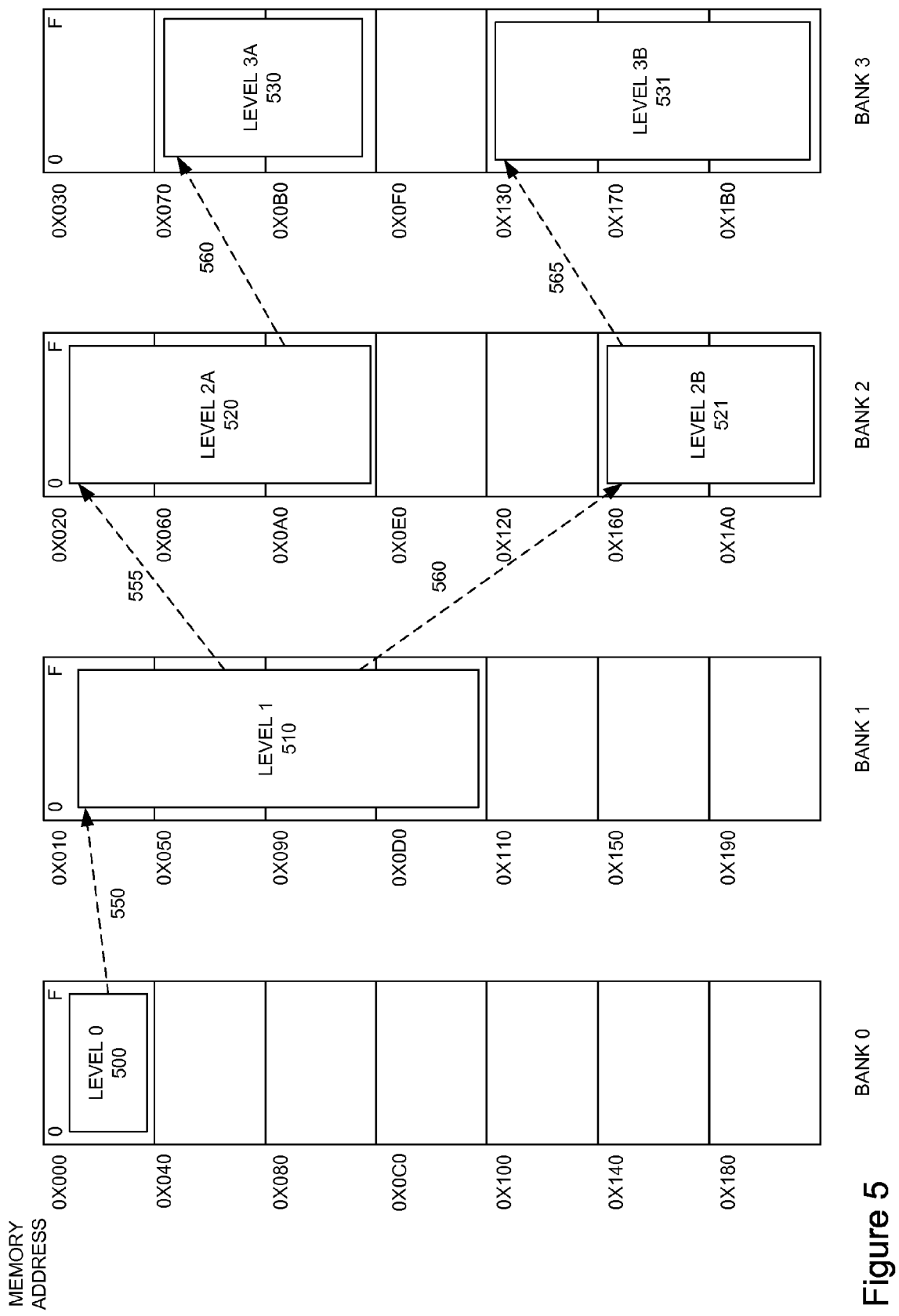
FIG. 5 is a block diagram illustrating a memory with a bank aware multi-bit trie (mtrie) according to embodiments of the invention.

FIG. 5 is a block diagram illustrating a memory with a bank aware multi-bit trie (mtrie) according to embodiments of the invention. FIG. 5 is similar to FIG. 2 except that FIG. 2 illustrated an mtrie that was not bank aware opposed to the bank aware mtrie of FIG. 5. FIG. 5 shows four banks of memory, banks 0-3, in four columns. The memory addresses start at 0x000 at the first memory chunk in bank and increment from left to right such that the first memory chunk of bank 1 is at address 0x010, the first memory chunk of bank 2 is at address 0x020, and the first memory chunk of bank 3 is at address 0x030. The second memory chunk of bank 0 is at address 0x040. This addressing scheme continues to the last, seventh, memory chunk of bank 0 being at address 0x180, the last chunk of bank 1 being at address 0x190, the last chunk of bank 2 being at address 0x1A0, and the last chunk of bank 3 being at address 0x1B0.

In FIG. 5, a four level bank aware mtrie is illustrated within the memory 340 distributed across the four memory levels. In bank 0, a root mtrie node level 0 500 is stored at addresses 0x000-0x00F. The root mtrie node 500 points to a mtrie child branch level 1 mtrie block 510 stored in bank 1 at addresses 0x010-0x01F, 0x050-0x05F, 0x090-0x09F, and 0x0D0-0x0DF. Two mtrie nodes in the level 1 mtrie block 510 point to two separate level 2 mtrie blocks stored in bank 2. Mtrie block 520 holds mtrie level 2A at addresses 0x020-0x02F, 0x060-0x06F, and 0x0A0-0x0AF. Mtrie block 521 holds mtrie level 2B at addresses 0x160-0x16F and 0x1A0-0x1AF. An mtrie node in block 520 points to level 3A in memory bank 3 at addresses 0x070-0x7F and 0x0B0-0x0BF. An mtrie node in block 521 points to level 3B in memory bank 3 at addresses 0x130-0x13F, 0x170-0x17F, and 0x1B0-0x1BF.

In FIG. 5, memory chunks are 16 bytes wide. Assuming that each mtrie node in an mtrie block is also 16 bytes, the memory controller can use an index into the mtrie block and the starting address of the mtrie block to convert to the memory address of the particular mtrie node. For example, if a lookup requires that the memory controller access the second mtrie node in level 2A 520 (index being 1 since the first mtrie node is index 0) then the memory controller can calculate a bank aware offset to add to the starting address for that mtrie block (0x020). The bank aware offset is equal to the index (I)*(the number of banks (B)*chunk size (CSZ)), in the exemplary case 1*4*16=64 (or 0x40) in hexadecimal. Adding 0x40 to the starting address of 0x20 yields a memory address of 0x060, or the second chunk in memory bank 2. Thus, Address(I)=Starting Address(SA)+Index(I)*(Banks (B)*ChunkSize(CSZ) or Ad(I)=SA+I*(B*CZ). Of course, such a calculation is reduced to scenarios in which the ChunkSize and the mtrie node size are equal.

In further embodiments, it is advantageous to store the spacing between mtrie nodes within an mtrie block in each mtrie node itself. If the Spacing(SP) is stored in the mtrie node then the address calculation reduces to Ad(I)=SA+I*SP. This allows the ChunkSize and the mtrie node size to diverge. Those of skill in the art would recognize that SP may equal the ChunkSize and it would still be advantageous to store SP in the mtrie node to avoid constant multiplication of B*CSZ during memory accesses. In one embodiment, it is advantageous to increase the mtrie node size to be equal to the ChunkSize. The increase of mtrie node size does not reduce the memory access rate since the memory controller must access the chunk regardless of using part of the chunk or all of the chunk.

Further it is advantageous to ensure that all accesses for a lookup are distributed across memory banks. Thus, the memory controller (such as 330) will map each level in the mtrie to a different memory bank, although not precluding that each level may be split into a plurality of mtrie block as shown with level 2 in FIG. 6. Using FIG. 6 as the example, each time a mtrie block is needed for level 2, memory would be allocated from memory bank 2. Thus, the memory controller can be assured that a given lookup for a key in the mtrie will present no bank collisions on its own since each memory read for each level will occur in a different memory bank. By constructing the mtrie to ensure no bank collisions occur in a given lookup, throughput to the memory device is maximized for that lookup.

In one embodiment, this mtrie allocation scheme is accomplished with a memory controller that allocates memory into slabs and slices. For example, using a 2-level slab allocator, the first level of the slab allocation allocates large regions (slabs) of memory and the second level doles out smaller fixed sized pieces from within the larger slabs. In the case of using a bank aware mtrie to implement an IP lookup table, one expects table updates to cause frequent changes to the table translating to retracting the underlying mtrie structure. From the memory management aspect, this translates to frequent allocations and deallocations (frees) of mtrie blocks. To fully support bank aware mtrie allocations, the memory controller treats each slab as a series of slices with each slice being contained in one memory bank. Each slice is treated as a contiguous block of memory using arithmetic address conversion such as described with reference to FIG. 5. Standard memory management algorithms can be run across all the slices that belong to a specific bank. If an allocation cannot be fulfilled then additional slabs are allocated and partitioned across the slices. If all slices of a slab are free then the coalescing logic takes care of combining them bank into the slab and freeing it back into the central pool.

Figure 6:
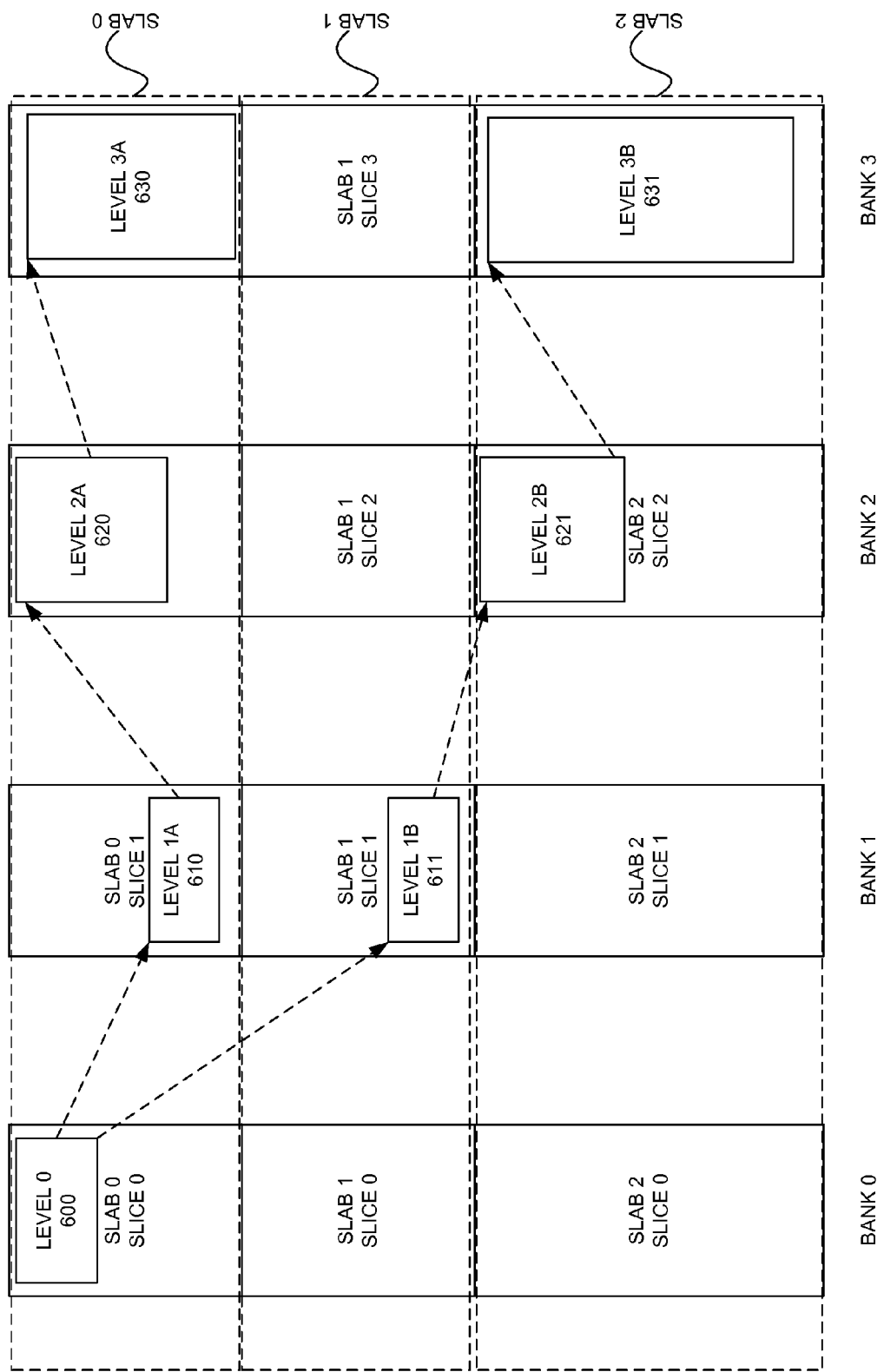
FIG. 6 is a block diagram illustrating a memory with a bank aware multi-bit trie (mtrie) in a slab/slice allocation according to embodiments of the invention.

FIG. 6 is a block diagram illustrating a memory with a bank aware multi-bit trie (mtrie) in a slab/slice allocation according to embodiments of the invention. Three slabs, slabs 0-2, of memory have been allocated in the memory of FIG. 6. Each slab is allocated across four memory banks and is further sliced into four slices, each slice contained within one memory bank. FIG. 6 contains a four level bank aware mtrie. The root mtrie node level 0 600 is stored in the first slice of the first slab, slab 0 slice 0 and points to level 1 which is split into two mtrie blocks. Mtrie block level 1A 610 is stored in slab 0 slice 1 and points to a second level mtrie block level 2A 620. Mtrie block level 1B 611 is stored in slab 1 slice 1 and points to a second level mtrie block level 2B 621. Mtrie block level 2A 620 is stored in slab 0 slice 2 and points to a third level mtrie block level 3A 630 stored in slab 0 slice 3. Mtrie block level 2B 621 is stored in slab 2 slice 2 and points to a third level mtrie block level 3B 631 stored in slab 2 slice 3.

The number of slabs into which each memory slab is partioned depends on the number of memory banks needed to achieve maximum aggregate throughput. If we refer to the eDRAM characteristics from the background, even though the memory itself is structured to contain eight banks per device, the access needs only to be spread over four memory banks to achieve maximum throughput. Therefore for eDRAM, it is sufficient to create only four slices. With four slice and eight banks, each slice will be comprised of two memory banks each. In such a scheme the chunks within the slices will be spread across two memory banks. Thus, memory access need not be spread amongst all eight banks so long as memory access is spread amongst the four slices. If the mtrie structure contains more levels than the number of slices, the memory controller performs a round-robin allocation of slices to mtrie levels without sacrificing throughput since the maximum number of accesses is spread over the slices which are already configured for maximum aggregate throughput.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A network element, to be coupled to a network, configured to receive packets from other network elements of the network, process those packets, and maintain an internet protocol (IP) address lookup table within a bank aware multi-bit trie (mtrie), the bank aware mtrie being a tree data structure utilized to store and maintain an IP address lookup table that associates destination addresses of packets with next hops of the packets, the network element comprising:
    a plurality of network interfaces configured to receive packets from other network elements of the network, each packet comprising a destination IP address;
    a processor coupled to the plurality of network interfaces and configured to:
        process the received packets, and
        determine a forwarding interface for one or more of the received packets;
    a memory coupled to the processor configured to store the bank aware mtrie;
    a memory control module coupled to the processor and coupled to the memory comprising a plurality or memory banks, the memory control module configured to:
        identify the plurality of memory banks present in the memory,
        identify one or more mtrie blocks in one or more mtrie levels in the bank aware mtrie, wherein each mtrie block is to be an array of mtrie nodes each associated with one or the one or more mtrie levels;
        store each of the one or more mtrie blocks in one of the plurality of memory banks, wherein all mtrie nodes for a given mtrie block are to be stored in the same memory bank only;
        store a stride length and a pointer to another mtrie block in one or more mtrie nodes;
        store a forwarding interface identifier in one or more mtrie nodes; and
        for each subsequent mtrie level:
            ensure that each of the mtrie blocks in that mtrie level is stored in one of the plurality of memory banks other than the memory bank that stores mtrie blocks of an immediately previous mtrie level.

2. The network element of claim 1, wherein the memory control module is further configured to ensure that all mtrie blocks in a given mtrie level are stored in the same one of the plurality of memory banks.

3. The network element of claim 1, wherein the memory control module is further configured to ensure that each memory bank containing mtrie blocks from one of the plurality of mtrie levels does not contain mtrie blocks from another one of the plurality of mtrie levels.

4. A method performed by a bank aware multi-bit trie (mtrie) control module for distributing a plurality of mtrie levels in a mtrie across a plurality memory banks in a memory, the bank aware mtrie control module being configured to set up and maintain a bank aware mtrie within the memory, the bank aware mtrie being a tree data structure utilized to store and maintain an IP address lookup table that associates destination addresses of packets with next hops of the packets, the method comprising the steps of:
    identifying the plurality of memory banks present in the memory;
    identifying one or more mtrie blocks in one or more mtrie levels, wherein each mtrie block is an array of mtrie nodes associated with an mtrie level;
    storing each of the one or more mtrie blocks in one of the plurality of memory banks, wherein all mtrie nodes in a given mtrie block are stored in the same memory bank only; and
    for each subsequent mtrie level:
        ensuring that each of the mtrie blocks in that mtrie level is stored in one of the plurality of memory banks other than the memory bank storing mtrie blocks of an immediately previous mtrie level.

5. The method of claim 4, further comprising the step of ensuring that all mtrie blocks in a given mtrie level are stored in the same one of the plurality of memory banks.

6. The method of claim 4, further comprising the step of ensuring that each memory bank containing mtrie blocks from one of the plurality of mtrie levels does not contain mtrie blocks from another one of the plurality of mtrie levels.

7. A memory control module to be coupled to a processor and a memory comprising a plurality of memory banks, the memory control module for distributing a plurality of multi-bit trie (mtrie) levels of bank aware mtries across the plurality of memory banks, the bank aware mtrie being a tree data structure utilized to store and maintain an IP address lookup table that associates destination addresses of packets with next hops of the packets, the memory control module comprising:
    a bank aware mtrie control module configured to:
        identify the plurality of memory banks present in the memory;
        identify one or more mtrie blocks in one or more mtrie levels in the mtrie, wherein each mtrie block is to be an array of mtrie nodes associated with one of the one or more mtrie levels;
        store each of the one or more mtrie blocks in one of the plurality of memory banks, wherein all mtrie nodes for a given mtrie block are to be stored in the same memory bank only; and
        for each subsequent mtrie level:
            ensure that each of the mtrie blocks in that mtrie level is stored in one of the plurality of memory banks other than the memory bank that stores the mtrie blocks of an immediately previous mtrie level.

8. The memory control module of claim 7, further configured to ensure that all mtrie blocks in a given mtrie level are stored in the same one of the plurality of memory banks.

9. The memory control module of claim 7, further configured to ensure that each memory bank containing mtrie blocks from one of the plurality of mtrie levels does not contain mtrie blocks from another one of the plurality of mtrie levels.

* * * * *